United States Patent [19]

Breen

[11] Patent Number: 5,005,264

[45] Date of Patent: Apr. 9, 1991

[54] FASTENER FOR CLOSING FLEXIBLE BAGS AND THE LIKE

[76] Inventor: Stanley Breen, 24 Downing St., Norwood, Mass. 02062

[21] Appl. No.: 570,975

[22] Filed: Aug. 22, 1990

Related U.S. Application Data

[63] Continuation of Ser. No. 323,428, Mar. 14, 1989, abandoned.

[51] Int. Cl.⁵ ............................................. B65D 77/18
[52] U.S. Cl. .................................... 24/30.5 R; 24/304; 24/306; 428/100
[58] Field of Search ................... 428/100, 40, 43; 24/30.5 R, 30.5 T, 30.5 P, 304, DIG. 11, 306, 442, 16 R, 16 PB; 383/71, 905

[56] References Cited

U.S. PATENT DOCUMENTS

| | | | |
|---|---|---|---|
| 1,775,995 | 10/1930 | Morrill | 24/30.5 T |
| 3,409,948 | 11/1968 | Goodwin | 24/30.5 T X |
| 3,784,087 | 1/1974 | Styers | 383/905 X |
| 3,857,139 | 12/1974 | Turner | 24/30.5 T |
| 4,091,766 | 5/1978 | Colliard | 428/100 X |
| 4,415,615 | 11/1983 | Esmay et al. | 428/40 |
| 4,460,804 | 7/1984 | Svejkovsky | 428/43 X |
| 4,645,697 | 2/1987 | Torigoe | 428/43 |
| 4,915,996 | 4/1990 | Curry | 24/30.5 R X |

FOREIGN PATENT DOCUMENTS 1169838  5/1964  Fed. Rep. of Germany ... 24/30.5 T

*Primary Examiner*—James R. Brittain
*Attorney, Agent, or Firm*—Davis Hoxie Faithfull & Hapgood

[57] ABSTRACT

An improved reusable fastener for closing flexible bags and the like. The fastener utilizes a conventional twist tie or the like adhered to a piece of tape having a pressure-sensitive adhering surface. The twist tie has two non-metallic sides, with a small diameter wire laminated or bonded therebetween. The width of the tie is less than the width of the tape, thereby leaving a portion of the pressure-sensitive adhering surface exposed. To use the fastener, the user closes the throat of the bag and places the fastener around the throat. The user presses the fastener together, resulting in the pressure-sensitive surface on the tape adhering to itself as the wire deforms. This keeps the throat of the bag closed. The bag will remain closed until the user pulls the ends of the tape apart. No twisting or untwisting of the ends of the twist tie is necessary.

10 Claims, 2 Drawing Sheets

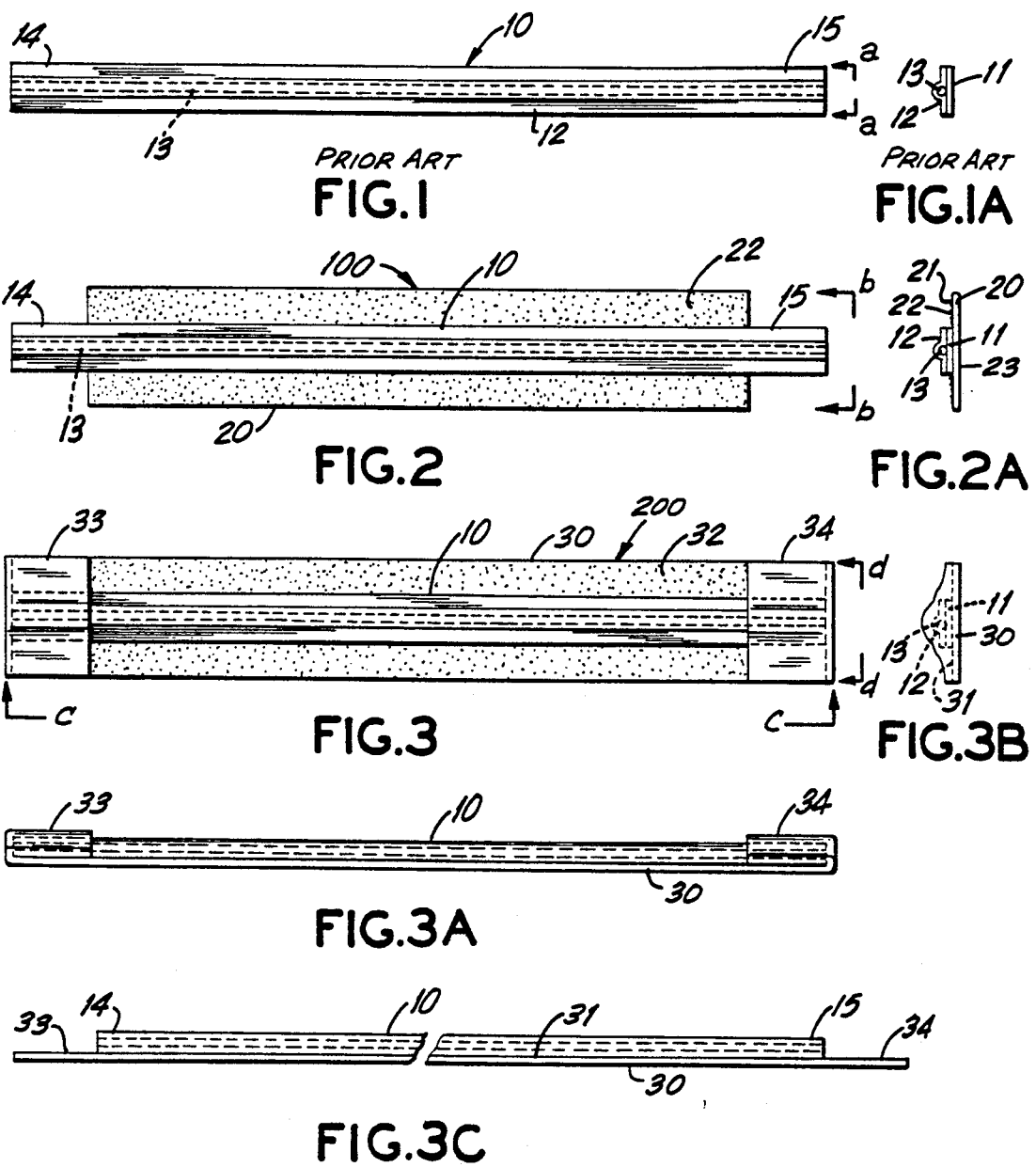

FASTENER FOR CLOSING FLEXIBLE BAGS AND THE LIKE

"This is a continuation of copending application(s) Ser. No. 07/323,428 filed on Mar. 14, 1989, abandoned."

BACKGROUND OF THE INVENTION

Fasteners for closing flexible bags such as plastic food storage bags and the like are well known in the prior art. For example, twist-tie fasteners have for many years been used to close food bags to preserve food freshness or prevent garbage odors from escaping from trash bags.

A conventional twist-tie fastener 10 is shown in FIGS. 1 and 1A. A first side of the fastener 10 is made of a non-metallic strip 11 such as paper and a second side is made of a non-metallic strip 12 such as plastic. The non-metallic strips are typically 4 to 10 inches long and approximately 5/16 inches wide. A small diameter wire 13 of the same length (4 to 10 inches) and typically having a diameter of 0.010 inches, is laminated between the two non-metallic strips 11 and 12.

When used to close the top opening of a flexible bag or the like, such as a bag containing a loaf of bread, the twist-tie fastener 10 is looped around the throat of the bag, resulting in the shape of the wire 13 being slightly deformed, and then the ends 14 and 15 of the twist tie 10 are twisted together, tightening the loop, thus closing the neck of the bag securely. In order to open the bag, the user must untwist the ends 14 and 15 of the twist tie 10, an oftentimes frustrating and time-consuming experience. For instance, the user is never quite sure whether the ends 14 and 15 had been twisted clockwise or counterclockwise when the bag was secured. This could result in the user inadvertently tightening the fastener closed on the bag when he or she means to open the bag.

Twisting ends 14 and 15 is also a difficult finger-dexterity function for older people or those with arthritis or finger-mobility disorders.

Also, if it is desired to re-use the conventional twist tie, by constant twisting and untwisting of the ends 14 and 15 of the tie 10, the shape of the wire 13 can become permanently deformed and even break, or the wire 13 can become separated from the strips 11 and 12, resulting in the tie being of no use as a fastener.

There remains a need for an inexpensive, reusable and easy to use fastener for flexible bags and the like.

BRIEF DESCRIPTION OF THE DRAWINGS

FIG. 1 is a plan view of a conventional twist-tie fastener;

FIG. 1A is an end elevational view of the twist-tie of FIG. 1 along lines a—a of FIG. 1;

FIG. 2 is a top plan view of a first embodiment of the fastener of the present invention;

FIG. 2A is an end elevational view of the fastener of FIG. 2 along lines b—b of FIG. 2;

FIG. 3 is a plan view of a second embodiment of the fastener of the present invention;

FIG. 3A is a front elevational view of the fastener of FIG. 3 along lines c—c of FIG. 3;

FIG. 3B is a end elevational view of the fastener of FIG. 3 along lines d—d of FIG. 3;

FIG. 3C is a front elevational view of the fastener of FIG. 3 showing the fastener partially assembled;

SUMMARY OF THE INVENTION

Figures 4, 4B:
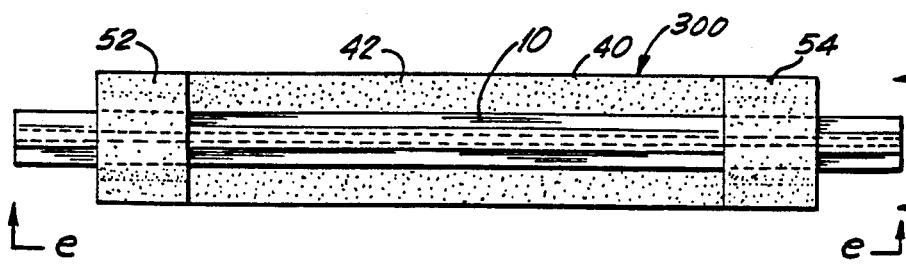
FIG. 4 is a plan view of a third embodiment of the fastener of the present invention.
FIG. 4B is an end elevational view of the fastener of FIG. 4 along lines f—f of FIG. 4.

The fastener of the present invention comprises a piece of tape having a pressure-sensitive adhering surface. A strip of deformable material, such as a conventional twist-tie fastener, is attached to the pressure-sensitive adhering surface. The width of the strip of deformable material is less than the width of the piece of tape thereby leaving an exposed portion of the pressure-sensitive adhering surface which is pressed against itself around the throat of a plastic bag in order to close the bag. The deformable material is longer in this first embodiment than the piece of tape, resulting in the ends of the deformable material acting as tabs. The fastener is opened by separating the ends of the fastener using the ends of the deformable material.

In a second embodiment the length of deformable material is less than the length of the piece of tape and the ends of the tape are folded over ends of the strip of deformable material so as to provide tabs at the ends of the fastener.

In a further embodiment reinforcing end strips are attached at the ends of the piece of tape in order to add strength to the fastener.

A hook-and-loop cloth such as that sold under the VELCRO trademark may be used in place of the pressure-sensitive adhering surface on the piece of tape.

DETAILED DESCRIPTION OF THE INVENTION

There are numerous possible embodiments of the fastener of applicant's invention, all of which avoid the problem of having to twist and untwist ends of the fastener to secure or release the fastener from the throat of the bag, as is required with the conventional twist tie 10 described in the "Background" section above.

FIGS. 2 and 2A show a first embodiment for a fastener 100 of the present invention. The fastener 100 combines a strip of deformable material, which, in this embodiment, is a conventional twist tie 10 (numbered as in FIG. 1, and as described above in the "Background" section) and a piece of pressure-sensitive tape 20. The twist tie 10 is attached to a first side 21 of the piece of tape 20. This first side 21 has a pressure-sensitive adhering surface 22 which serves to keep the fastener 20 closed around the throat of the flexible bag, as described below. This adhering surface 22 could also be made of a hook-and-loop type of cloth, such as that sold under the VELCRO trademark.

The tape 20 in this first embodiment is a commercial plastic or masking tape having at least one adhesive surface, such as a tape sold by the Mystic Corporation, 1700 Winnetka Ave., Northfield, Ill. 60093, under the MYSTIC trademark. For example, applicant has made a prototype fastener of the present invention using MYSTIC MASKING tape 6230/275B - ½ inch INX, which is supplied in 60 yard rolls. Masking tapes are made of a rough paper having a pressure-sensitive adhesive surface on one side.

Any suitable means may be used for attaching the twist tie 10 to the side 21 of tape 20, including the use of a glue or adhesive or use of a laminating process. In the embodiment shown in FIG. 2, no separate attaching means is necessary, as the twist tie 10 attaches directly to the pressure-sensitive adhering surface 22 on the tape 20. Manufacturing techniques are readily available for attaching the tie 10 to the tape 20 in mass-production quantities.

The paper surface 11 of tie 10 is preferably placed against the pressure-sensitive surface 22 to maximize the adhesion of the wire 13 to the pressure sensitive tape 20. The plastic surface 12 does not adhere to the pressure-sensitive surface 22 of tape 20 as firmly as the paper surface 11 adheres to the surface 22. Therefore, the tie 10 remains stuck to the tape 20, even after repeated cycles of closing and opening.

As seen in FIGS. 2 and 2A, the width of the tie 10 is less than the width of the tape 20. This insures that even when the tie 10 is attached to the side 21 of the tape 20 there remains an exposed portion of pressure-sensitive adhering surface 22. The twist tie 10 is attached to side 21 intermediate the top edge and bottom edge of tape 20, in order to have (preferably) an equal amount of exposed portion of the surface 22 above and below the tie 10, although it is not necessary to center the tie 10.

In the FIG. 2 embodiment, the length of the twist tie 10 is greater than the length of the tape 20. Therefore, ends 14 and 15 of twist tie 10 extend beyond the ends of the tape 20. This feature is important for purposes of releasing the fastener 100 and opening the bag, as described below.

To use the fastener 100, the user closes the bag by twisting the throat of the bag or the like and places the fastener 100 around the throat of the bag. The user then presses the fastener together, resulting in the deformation of the shape of the wire 13. The fastener 100 thus surrounds the throat of the bag. The pressure exerted by the user causes the pressure-sensitive adhering surface 22 to adhere to itself, thereby keeping the bag closed. Because the wire 13 is soft (or annealed), it will not spring back under the pressure of the throat of the bag under normal circumstances and the bag will remain closed until the user pulls the ends 14 and 15 of the twist tie 10 apart. The fact that the wire 13 is strongly bonded or laminated between the paper surface 11 and the plastic surface 12 of tie 10 insures that the entire assembly of tie lo remains bonded to tape 20 even after repeated openings and closing of the bag.

It is understood that any deformable material which does not spring back from a deformed condition under normal loads from the flexible bag may be used in place of the twist tie 10 having the wire 13, provided the deformable material is made to adhere strongly to the surface 22 of tape 20. For example, a bare piece of wire laid down on surface 22 does not result in a useful device as the wire parts from the surface 22 the first time the device is opened.

The present invention has a clear advantage over the conventional twist tie in that no twisting action is necessary to secure the fastener around the neck of the flexible bag, nor is an untwisting motion necessary to remove the fastener. The pressing action required to secure the fastener 100 is easy for anyone to accomplish, regardless of his or her finger dexterity.

To open the bag, the user pulls ends 14 and 15 apart, releasing surface 22 from itself, and thus allowing access to the interior of the bag through the opening at the top of the throat. A readily seen advantage of the fastener 100 is that it can be quickly and easily reused so long as the surface 22 retains its adhering qualities. It has been determined through testing by applicant that MYSTIC brand tape described above can be used as the tape 20 on a conventional bread storage bag for at least twenty fastening and unfastening events. (Configuration shown in FIG. 3.)

Since there is no twisting deformation of the wire 13 in the FIG. 2 present invention, the fastener 100 is less likely to come loose from the laminate or bonding with sides 11 and 12, nor is twist tie 10 likely break or retain a permanently deformed condition. This is another clear advantage over the conventional twist tie.

Also, no extra step of twisting the ends 14 and 15 of the twist tie 10 is necessary with the fastener 100, although for permanent closure ends 14 and 15 of tie 10 may be twisted together in the conventional fashion. When used in this manner, it is difficult to open the fastener 100, and therefore almost impossible to untwist the throat of the bag.

Another advantage of the fastener 100 is that it remains on the throat of the bag even after the bag is opened, due to the surface 22 adhering to part of the throat of the plastic bag.

The extra length of the twist tie 10 compared to the tape 20 in the FIG. 2 embodiment allows the user to pull apart the fastener 100 easily using ends 14 and 15 of the twist tie 10. Also, the greater width of tape 20 compared to twist tie 10 insures that there is sufficient exposed portion of surface 22 so that the fastener 20 ca be secured around the throat of the flexible bag.

The width of a back side 23 of tape 20 can also be used for a universal product code, product price tag, advertisement or other printed or embossed communication or message.

FIGS. 3, 3A, 3B and 3C show a second embodiment of the fastener of the present invention. A strip of deformable material, such as twist tie 10, is again used. The designations of elements 11, 12 and 13 are the same as described above with respect to the conventional twist tie 10 shown in FIG. 1.

The twist tie 10 is attached to a first side 31 of a piece of tape 30 in the same manner as discussed above with respect to the FIG. 2 embodiment. As in the prior embodiment, this first side 31 has a pressure-sensitive adhering surface 32 which serves to hold the tie 10 to side 31, and to keep the fastener 200 closed around the throat of the flexible bag.

As seen in FIG. 3C, the tape 30 is longer than the twist tie 10. After the twist tie 10 is attached to the side 31 in an of the manners previously described, ends 33 and 34 of the tape 30 are folded over the ends 14 and 15 of the tie 10 and secured in that position by the adhering qualities of the surface 32. A separate attaching means such as a laminate may also be used to secure the ends 33 and 34 of the tape 30 once they are folded over the ends 14 and 15 of the tie 10.

FIG. 3C shows the ends 33 and 34 of tape 30 in the unfolded position and FIG. 3A shows the ends 33 and 34 folded over the ends 14 and 15 of the tie 10 in the fully assembled position.

The fastener 200 is applied to the throat of a flexible bag in the same manner as described with regard to the FIG. 2 embodiment, with surface 32 adhering to itself.

To release the fastener 200 and open the bag, the user pulls apart the tabs created by the folding over of ends 33 and 34 of the tape 30. These tabs are wider than the ends 14 and 15 of the tie 10 and therefore are easier for the user to grasp than in the FIG. 2 embodiment. Also, the fold-over arrangement adds support to the fastener 200, and makes it less likely that it will tear or that the tie 10 will somehow become detached from the side 31 of the tape 30. An additional advantage of this embodiment is the ease of manufacture.

Figure 4A:
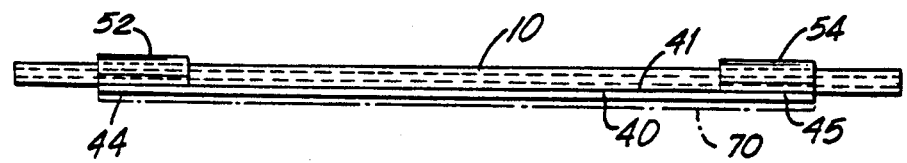
FIG. 4A is a front elevational view of the fastener of FIG. 4 along lines e—e of FIG. 4.

The third embodiment shown in FIGS. 4, 4A and 4B is similar in construction to the FIG. 2 embodiment where the tie 10 is longer than the tape 40. In this embodiment for a fastener 300, reinforcing end strips 52 and 54 are secured over the tie 10 at ends 44 and 45 of tape 40. The strips 52 and 54 are a plastic tape material, and adhere to the pressure-sensitive adhering surface 42 on side 41 of tape 40. Any suitable means for attaching the end strips 52 and 54 to the ends 44 and 4 of tape 40 may be used.

Strips 52 and 54 prevent the tie 10 from coming loose from tape 40, and also aid in preventing the fastener 300 from tearing. Strips 52 and 54 may also be different colors from one another and from tape 40 in order to aid the user in locating the tabs when opening the fastener 300. Also, a backing tape 70 shown as dashed lines may be attached to the back side of tape 40 for added strength for fastener 300. A UPC code or the like may be placed on the backing tape 70, as well as an advertising message or other communication.

The fastener 300 is used to close the flexible bag in the same manner as fastener 100 shown in FIG. 2 and described above.

Figures 5, 5A:
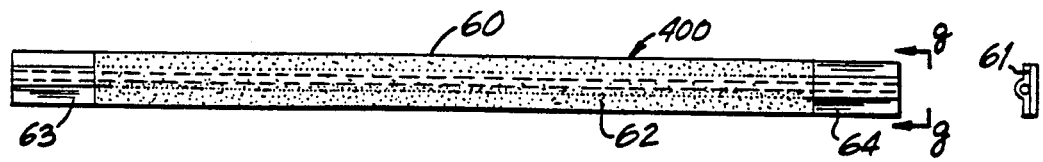
FIG. 5 is a plan view of a fourth embodiment of the fastener of the present invention.
FIG. 5A is an end elevational view of the fastener of FIG. 5 along lines g—g of FIG. 5.

A fourth embodiment of the fastener is shown in FIGS. 5 and 5A. This fastener 400 consists of the conventional twist tie 60 of FIG. 1 with a pressure-sensitive adhering surface 62 on one side 61 of the tie 60. The adhering surface 62 does not extend the entire length of the tie 60, but rather is only present on a middle portion of side 61 intermediate the two ends 63 and 64 of the tie 60.

This fourth embodiment is secured around the neck of a flexible bag in the same manner as the prior embodiments, where adhering surface 62 adheres to itself. To reopen the bag, the user pulls the ends 63 and 64 apart, releasing surface 62 from itself.

The FIG. 5 construction is much simpler and utilizes fewer materials at a lower cost than those embodiments requiring a separate piece of tape. The fastener 400 is more appropriate for light-duty use, for example with small bags containing a light load, such as a small bag of popped corn or a few crackers.

In the embodiments shown in FIGS. 2, 3, 4 and 5 the sides of the tie 10 may be stuck together and then twisted together in a conventional manner in order to enhance the closing ability of the fastener for permanent closure of the flexible bag and its contents.

It is understood that my invention is defined by the following claims.

I claim:

1. An improved fastener for closing the open end of a flexible container comprising the combination of:
   a piece of tape having a pressure-sensitive adhering surface on a first side;
   a strip of deformable material, wherein the length of the strip of deformable material is greater than the length of the piece of tape;
   means for attaching the strip of deformable material to the pressure-sensitive adhering surface of the piece of tape wherein the width of the strip of deformable material is less than the width of the piece of tape thereby leaving an exposed portion of the pressure-sensitive adhering surface, wherein the strip of deformable material is deformed around the neck of the container and the pressure-sensitive adhering surface is pressed against itself at the exposed portion in order to close the container.

2. The fastener of claim 1 also comprising first and second reinforcing end strips of tape placed over first and second portions of the strip of deformable material and means for attaching the reinforcing end strips to the exposed portion of the pressure sensitive adhering surface at first and second ends of the piece of tape.

3. The fastener of claim 1 wherein the strip of deformable material comprises
   a first non-metallic strip;
   a second non-metallic strip; and
   a small diameter wire secured between the first and second non-metallic strips.

4. The fastener of claim 3 also including means for adhering the small diameter wire to the first non-metallic strip, means for adhering the small diameter wire to the second non-metallic strip, wherein the first non-metallic strip adheres more strongly to an adhesive than does the second non-metallic strip.

5. The fastener of claim 1 wherein the pressure-sensitive adhering surface on the first side of the piece of tape is an adhesive coating.

6. The fastener of claim 1 also including a piece of backing tape attached to a second side of the piece of tape.

7. The fastener of claim 1 wherein the strip of deformable material will not spring back of its own accord to its original shape after it is deformed around the neck of the container.

8. An improved fastener for closing the open end of a flexible container comprising the combination of:
   a piece of tape having a pressure-sensitive adhering surface on a first side;
   a strip of deformable material;
   means for attaching the strip of deformable material to the pressure-sensitive adhering surface of the piece of tape wherein the width of the strip of deformable material is less than the width of the piece of tape, thereby leaving an exposed portion of the pressure-sensitive adhering surface wherein the strip of deformable material is deformed around the neck of the container and the pressure-sensitive adhering surface is pressed against itself at the exposed portion in order to close the container and wherein the length of the strip of deformable material is less than the length o the piece of tape and first and second ends of the piece of tape are folded over respective first and second ends of the strip of deformable material and attached to the exposed portion of the pressure-sensitive adhering surface of the piece of tape so as to provide tabs at the ends of the fastener.

9. An improved fastener for closing the opening end of a flexible container comprising a strip of deformable material having a first non-metallic strip, a second non-metallic strip, and at least one small diameter wire laminated between respective inside surfaces of the first and second nonmetallic strips, the improvement comprising a pressure-sensitive adhering surface on a portion of an outside surface of the first non-metallic strip intermediate the ends of the first non-metallic strip, wherein the pressure-sensitive adhering surface does not extend the entire length of the first non-metallic strip and wherein the wire is deformed around the neck of the container and the pressure-sensitive adhering surface is pressed against itself in order to close the container.

10. An improved fastener for closing the open end of a flexible container comprising the combination of:
- a piece of tape having a pressure-sensitive adhering surface on a first side;
- a strip of deformable material;
- means for attaching the strip of deformable material to the pressure-sensitive adhering surface of the piece of tape wherein the width of the strip of deformable material is less than the width of the piece of tape thereby leaving an exposed portion of the pressure-sensitive adhering surface;
- a first non-adhering end tab at a first end of the fastener;
- a second non-adhering end tab at a second end of the fastener, wherein the strip of deformable material is deformed around the neck of the container and the pressure-sensitive adhering surface is pressed against itself at the exposed portion in order to close the container.

* * * * *